United States Patent [19]
Dang

[11] Patent Number: 5,453,998
[45] Date of Patent: Sep. 26, 1995

[54] CIRCUIT FOR PROCESSING DATA TO/FROM AN ARRAY OF DISKS

[75] Inventor: Kim C. Dang, Orange, Calif.

[73] Assignee: Unisys Corporation, Blue Bell, Pa.

[21] Appl. No.: 53,052

[22] Filed: Apr. 26, 1993

[51] Int. Cl.$^6$ .......................... G06F 11/10; H03M 13/00; G08C 25/00; H04L 1/00
[52] U.S. Cl. .................. 371/51.1; 371/48; 371/37.7
[58] Field of Search .................. 371/51.1, 37.1, 371/49.2, 48, 37.6, 37.7; 364/236.2, 236.4, 238.4, 268.5, 285.3, 952.1

[56] References Cited

U.S. PATENT DOCUMENTS

| | | |
|---|---|---|
| 4,775,975 | 10/1988 | Oka .......................................... 371/39 |
| 5,172,379 | 12/1992 | Burrer et al. .......................... 371/37.1 |
| 5,220,569 | 10/1993 | Hartness .................................. 371/37.7 |

*Primary Examiner*—Robert W. Beausoliel, Jr.
*Assistant Examiner*—T. Tu
*Attorney, Agent, or Firm*—Charles J. Fassbender; Mark T. Starr; Robert R. Axenfeld

[57] ABSTRACT

An array processing circuit which operates on a M row-N column array of digital words includes a first set of N memories, each of which asynchronously receives a respective column of words from a separate input channel; and, a second set of N memories which have respective inputs that are coupled to corresponding outputs of the first set of memories. A first addressing circuit detects when each memory of the first set contains a respective word of the same row, and in response transfers that row of words in parallel to the second set of memories. N-1 column error detect circuits respectively detect when a column of words from the first N-1 memories of the first set has an error. And, when only the i-th one of those error circuits detects an error, a second addressing circuit—a) sequentially reads words from each of the memories 1 thru i-1 of the second set, b) reads words from all N of the second set of memories in parallel, c) sequentially reads words from each of the memories i+1 thru N-1 of the second set; and then, repeats the reading sequence a) thru c) until all of the words in the array are read. Also, the array processing circuit includes up to seven other detailed circuit features.

10 Claims, 7 Drawing Sheets

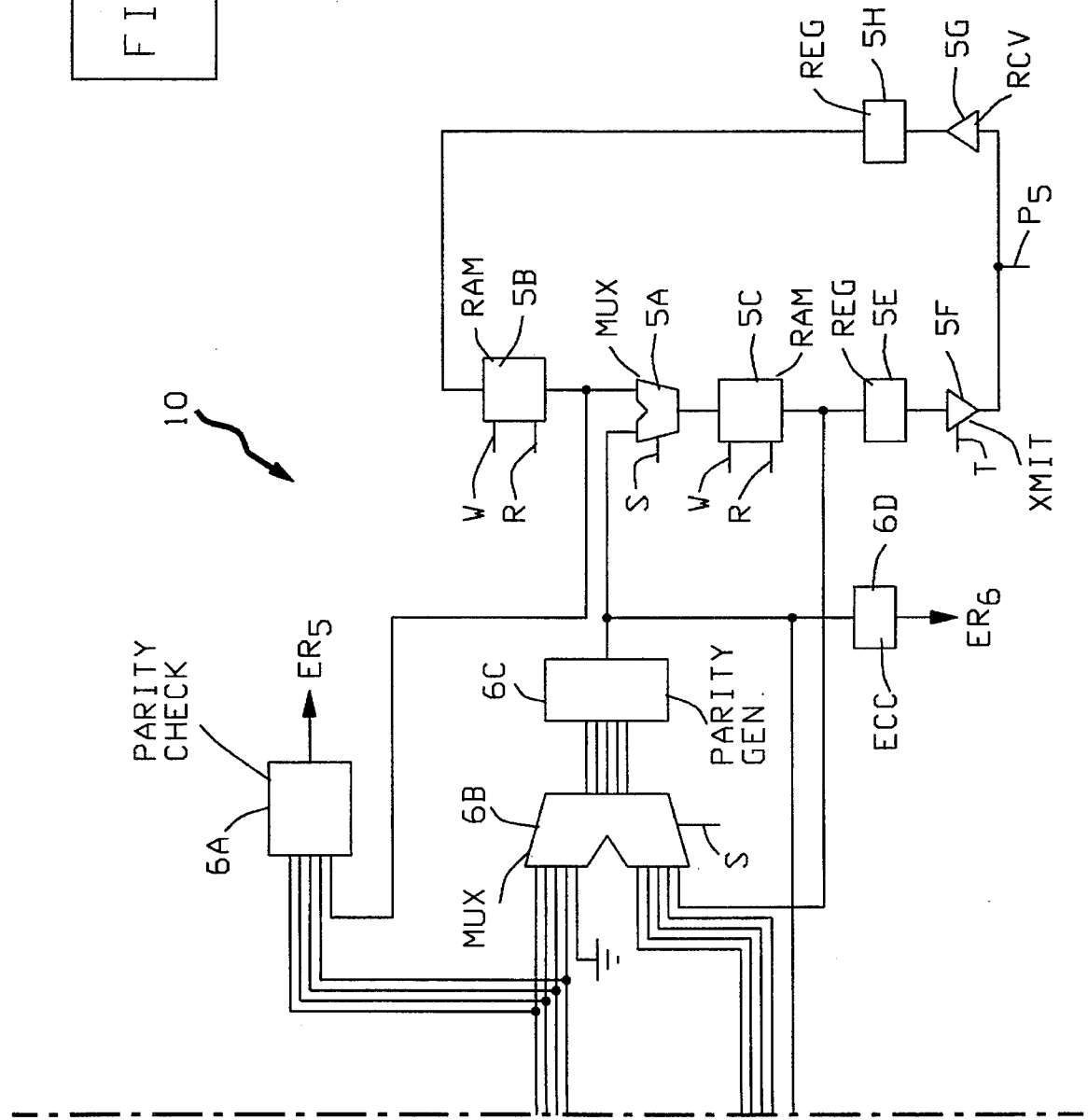

CIRCUIT FOR PROCESSING DATA TO/FROM AN ARRAY OF DISKS

BACKGROUND OF THE INVENTION

This invention relates to electronic circuits which process arrays of data.

By an array of data is herein meant data which is arranged in multiple rows and multiple columns. Such an array of data occurs in disk systems where the respective columns of the array are written in parallel onto separate disks; and thereafter, the respective columns of the array are read back in parallel from the separate disks.

Examples of the above array processing disk systems are found in the following patents and technical papers: 1) U.S. Pat. No. 4,722,085 by Flora et al entitled "High Capacity Disk Storage System Having Unusually High Fault Tolerance Level and Bandpass"; 2) U.S. Pat. No. 4,775,978 by Hartness entitled "Data Error Correction System"; 3) "RAID Architecture Provides Increased Throughput and Capacity" by Ernest Ohrenstein, Computer Technology Review, Spring 1989, pages 37–41; 4) "A Case For Redundant Arrays of Inexpensive Disks (RAID)", by Patterson, Gibson, and Katz, Report No. VCB/CSD 87/39/ from the Computer Science Division of the University of California at Berkeley, December 1987, pages 1–24; and, 5) "RAID 5 Architecture Provides Economical Failsafe Disc Storage" by M. Anderson, EDN, June 1991, pages 141–143.

However, in all the above cited references, the array processing circuits which are disclosed have various drawbacks and limitations. For example, in Flora, each row in the array is required to have an error code which both detects when an error occurs in the row and corrects that error. Using the Flora system, both the error checking and correcting is done one row at a time. But, that is a relatively slow process in comparison to present invention wherein only one error check is performed on each column; and, only error correcting is performed row-by-row. Further, to be able to check for errors on each column and only correct errors row-by-row requires an entirely different array processing circuit than that which is disclosed by Flora.

In Hartness, the errors are detected on each column and corrected row-by-row. However, to achieve the above result, Hartness requires every column of the array, including the parity column, to have an error check code (ECC) as the last entry in the column. Consequently, the parity column in the array cannot be the same length as the other columns; the parity column requires one entry for each row in the other columns plus it requires an extra entry for the ECC character. Having an unequal number of entries in every column is highly undesirable because it forces the disks on which the columns are stored to have different formats and thus be non-interchangeable.

Also in Hartness, when a column of data has an error, every column including the erroneous column is processed in order to correct the error. By comparison, the present invention corrects errors with a completely different method and circuit in which the erroneous column is ignored and excluded from processing.

Further, in order for the Hartness circuitry to even operate, all of the disks on which an array of data is stored must rotate in synchronization such that each disk reads and/or writes a respective word of the same row at the same time instant. This constraint makes the Hartness circuits very impractical since commercially available disks rotate independently with respect to each other.

Ohrenstein discloses a disk array system called RAID (Redundant Array of Inexpensive Disks). However, Ohrenstein merely discusses various system level functional aspects of the RAID system—such as its fault tolerance and high throughput; Ohrenstein does not teach or describe any circuits which are needed to actually build a RAID system. In Ohrenstein, the only diagram of the RAID system is disclosed in FIG. 1; and there, the entire control circuitry for processing the array of data to/from the disks is shown as one black box.

Likewise, in the UC Berkeley reference, additional RAID systems are disclosed and classified as RAID level one thru RAID level five. But here again, the description and classification is from a functional viewpoint at a system level; and, no circuitry for building a system is shown. See, in particular, the system diagrams of FIGS. 1 and 2, and the RAID data distribution diagrams of FIGS. 3 and 4.

Anderson, in his above cited article, merely evaluates the RAID-5 system and concludes that it creates the smallest bottleneck when errors are corrected because the parity column is distributed over several disks instead of one. But again in this evaluation, no diagrams of any RAID circuitry is provided.

Accordingly, a primary object of the present invention is to provide an actual electronic circuit with all of the intricate details that are needed to process arrays of data to/from an array of disks, and which has none of the above identified drawbacks.

BRIEF SUMMARY OF THE INVENTION

In accordance with the present invention, the central portion of an array processing circuit which operates on a row-column array of digital words includes a first set of N memories, each of which asynchronously receives a respective column of words from a separate input channel; and, a second set of N memories which have respective inputs that are coupled to corresponding outputs of the first set of memories. Further included is a first addressing circuit which detects when each memory of the first set contains a respective word of the same row, and in response transfers that row of words in parallel to the second set of memories. Also included are N−1 column error detect circuits, having inputs respectively coupled to the outputs of the first N−1 memories of the first set, each of which detects when a column of words from the memory to which it is coupled has an error. And, further included is a second addressing circuit having inputs coupled to the N−1 column error detect circuits, which when only the i-th one of those error circuits detects an error, a) sequentially reads words from each of the memories 1 thru i-1 of the second set, b) reads words from all N of the second set memories in parallel, c) sequentially reads words from each of the memories i+1 thru N−1 of the second set; and then, repeats the reading sequence a) thru c) until all of the words in the array are read.

With this portion of the circuit, the disks from which the array of words is read can rotate independently of each other. Also, errors in the array are detected by column and presented for correction by row. Further, words from the different columns of the array are separately read in a sequence, except that each time a word in an erroneous column is to be read, an entire row of words from all of the columns is read; and, that enables the words in the erroneous column to be corrected.

Preferably, the above central portion of the array processing circuit further includes up to seven other detailed circuit features. These additional features are:

1) a bit-parity generator circuit, having inputs coupled to the outputs from the second set of memories, which generates bit-parity signals for corresponding bits in the words that are read in parallel by the second addressing circuit excluding the words from the ith memory of the second set;

2) an N-th column error detect circuit, having inputs coupled to receive the bit-parity signals from the bit-parity generator circuit, which detects when a complete column of the bit-parity signals contains an error and generates an error signal indicating same;

3) the above second addressing circuit having a respective counter and a corresponding multiplexor for each of the memories 1 thru N−1 of the second set with each counter sending first address signals to a first input on its corresponding multiplexor, and an additional multiplexor which receives the first address signals from all of the respective counters and passes the i-th one of the received first address signals to a second input on all of the corresponding multiplexors;

4) an output selection circuit, having inputs coupled to the outputs of the memories 1 thru N−1 of the second set and the parity generator circuit, which transfers to an output port the data words from those memories as they are read by the addressing circuit except that the data words which are read in parallel are replaced with the bit-parity signals from the bit-parity generator circuit;

5) the parity generator circuit and the N-th column error detect circuit operate on a first array words from the second set of memories, while simultaneously, the column error detect circuits 1 thru N−1 operate on a second array of words from said first set of memories, 6) a bit parity check circuit, having inputs coupled to the outputs from the memories of the first set, which check parity on corresponding bits in the row of words therefrom; and, a control circuit which generates a control signal when none of the column error detect circuits 1 thru N−1 detects an error but the parity check circuit does detect a parity defect; and, 7) the bit-parity generator circuit having a set of multiplexors 1 thru N with each multiplexor having a first input respectively coupled to the output of the memories 1 thru N of the second set, with multiplexor 1 thru N−1 having a second input respectively coupled to the output of the memories 1 thru N−1 of the first set, and with the i-th multiplexors being disabled by the i-th column error detect circuit detecting an error.

DETAILED DESCRIPTION

Figure 1A:
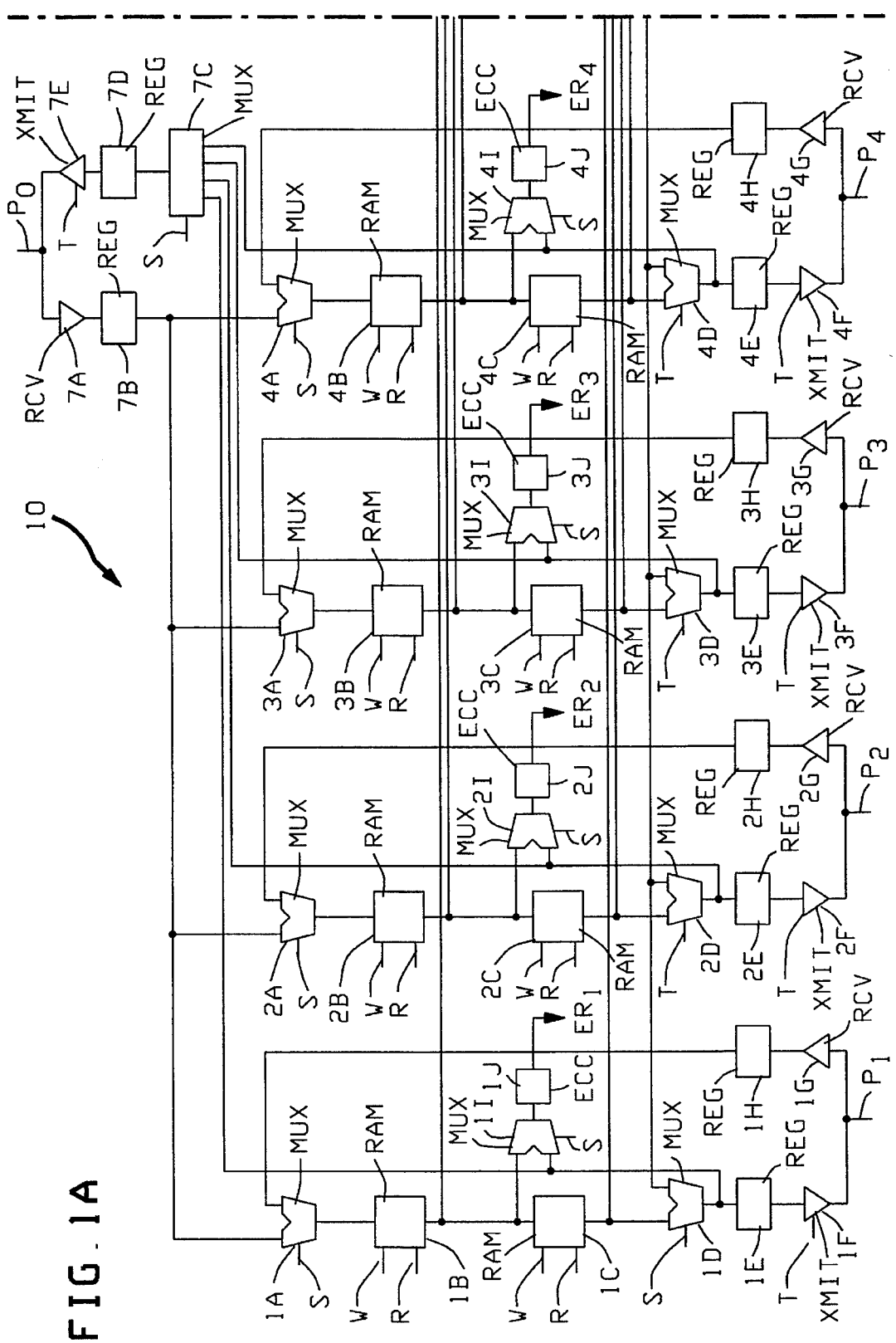
FIG. 1 shows an array processing circuit which is structured as one preferred embodiment of the invention.

Referring now to FIG. 1, the details of an array processing circuit 10 which is structured as one preferred embodiment of the invention will be described. With this embodiment 10, the array that is processed has five columns of digital data words; each data word in a column has eight data bits; and, each column has five-hundred-twelve data words.

Data words in the first column are processed by the FIG. 1 circuit modules 1A–1J. Likewise, data words in the second, third and fourth columns respectively are processed by the FIG. 1 circuit modules 2A–2J, 3A–3J, and 4A–4J. Data words in the fifth column are processed by the FIG. 1 circuit modules 5A–5H. Data words from all five columns are processed by the remaining FIG. 1 circuit modules 6A–6D and 7A–7E. Each of these FIG. 1 circuit modules is defined by Table 1 below.

TABLE 1

| CIRCUIT MODULE | DESCRIPTION |
| --- | --- |
| Each module 1A–5A | 2 × 1 Multiplexor |
| Each module 1B–5B | Dual port RAM, holds 64 words |
| Each module 1C–5C | Dual port RAM, holds 512 words |
| Each module 1D–4D | 2 × 1 Multiplexor |
| Each module 1E–5E | Register |
| Each module 1F–5F | Transmitter |
| Each module 1G–5G | Receiver |
| Each module 1H–5H | Register |
| Each module 1I–4I | 2 × 1 Multiplexor |
| Each module 1J–4J | Column error detect circuit |
| 6A | Bit parity check circuit |
| 6B | 2 × 1 multiplexor (5 words wide) |
| 6C | Bit parity generator circuit |
| 6D | Column error detect circuit |
| 7A | Receiver |
| 7B | Register |
| 7C | 4 × 1 multiplexor |
| 7D | Register |
| 7E | Transmitter |

In FIG. 1, each of the illustrated signal lines which interconnect the above defined circuit modules carry a complete data word. Thus, for example, the interconnection I from multiplexor 1A to RAM 1B (Random Access Memory 1B) provides a data path for one word. Also, each multiplexor has select control lines S that select one data word to the multiplexor and pass it to the multiplexor output; each RAM has write control lines W which receive a write address and a write pulse for the RAM; each RAM has read control lines R which receive a read address for the RAM; and each transmitter has a transmit control line T which enables the data word on the transmitter input to pass to its output. For the sake of simplifying FIG. 1, these control lines are labeled only on the circuit modules 1A, 1B, 1C, 1D and 1F.

Figure 2:
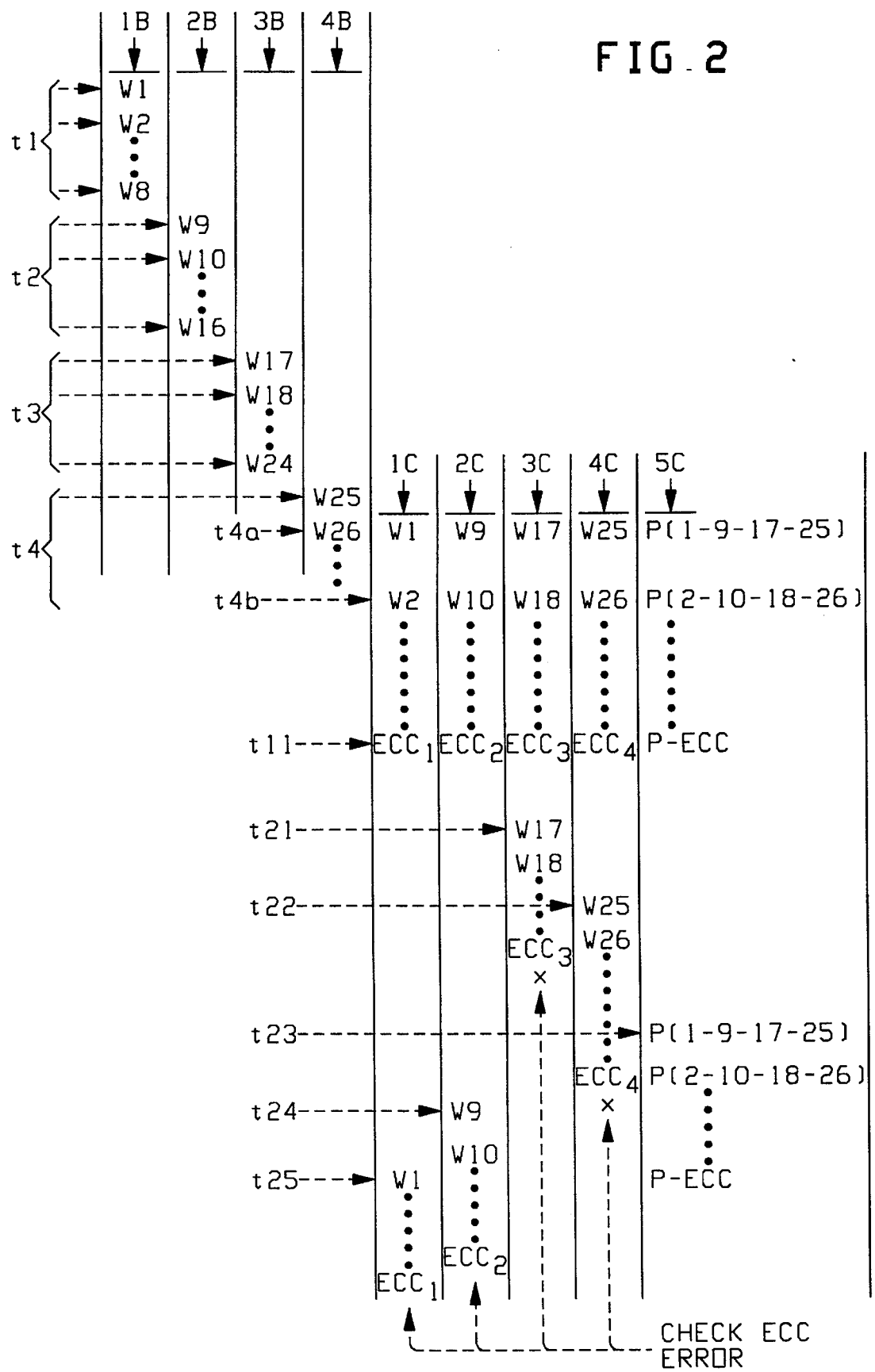
FIG. 2 is a timing diagram that shows the manner by which the FIG. 1 circuit writes an array of data words to an array of disks.

One operation which is performed by the FIG. 1 circuit 10 is an array write; and, the details of this operation are shown in FIG. 2. Initially, during time interval t1, eight data words W1–W8 are sequentially received on I/O port $P_O$ and passed through the circuit modules 7A, 7B and 1A into the RAM 1B. Thereafter, during time interval t2, eight data words W9–W16 from port $P_O$ are sequentially passed through the circuit modules 7A, 7B and 2A into the RAM 2B; then during time interval t3, eight data words W17–W24 are sequentially passed through the circuit modules 7A, 7B and 3A into RAM 3B; then during time interval t4, eight data words W25–W32 are sequentially passed through the circuit modules 7A, 7B and 4A into RAM 4B. This loading of the RAM's 1B–4B then repeats in the same fashion until a complete array of words has been loaded.

Whenever everyone of the RAM's 1B–4B stores at least one data word, those words are transferred a row at a time into the RAM's 1C–4C. Thus at time t4a, which is immediately after the loading of word W25 during time t4, the row of words W1-W9-W17-W25 is written into the RAM's 1C–4C. Similarly, at time t4b, the next row of words W2-W10-W18-W26 is read from the RAM's 1B–4B and written into the RAM's 1C-4C.

Also, each time a row of words is read from the RAM's 1B–4B, that row of words is passed through the circuit modules 6B and 6C to thereby generate a bit-parity word. In this bit-parity word, the i-th bit is the exclusive-or of the i-th bits from every word in the row of words. For example, the first bit is the exclusive-or of the first bit in the row of words from the memories 1B–4B. Then, after each bit-parity words is generated, it is passed through the multiplexor 5A and written into the RAM 5C. In FIG. 2, the bit-parity word P(1-9-17-25) is generated from the data words W1-W9-W17-W25 and stored in the RAM 5C at time t4a.

Each column of words that is written into the RAM's 1B–4B, and subsequently transferred to the RAM's 1C–4C as described above, has a respective error check code (ECC) as the last data word in the column; and it is generated external to the port $P_O$. This error check code for columns 1, 2, 3 and 4 is shown in FIG. 2 at time t11 respectively as $ECC_1$, $ECC_2$, $ECC_3$, and $ECC_4$. When the row of error check codes is transferred from the RAM's 1B–4B to the RAM's 1C–4C, a bit-parity word P-ECC is generated on them by the circuit modules 6B and 6C, and that word P-ECC is then stored in the RAM 5C.

After everyone of the RAM's 1C–5C stores at least one word, those words start to be read asynchronously from the RAM's and sent to the transmitters 1F–5F of the I/O ports $P_1$–$P_5$. FIG. 2 shows an example of this wherein the third column of words beginning with word W17 starts to be read from the RAM 3C at time t21; the fourth column of words beginning with word W25 starts to be read from the RAM 4C at time t22; etc. Note that for the sake of simplicity, FIG. 2 shows the first read at time t21 occurring after the last write at time t11; but in actuality, many reads occur before the last write since the reads and writes to the RAM's 1C–5C overlap.

As each column of words in read from a respective one of the RAM's 1C–4C, those words are sent to a corresponding one of the column error detect circuits 1J–4J. For example, the column of words from the RAM 1C is sent through the multiplexors 1D and 1I to the column error detect circuit 1J. If the column of words from the RAM 1C contains an error, then the circuit 1J will generate a "1" for error signal $ER_1$; if the column of words from the RAM 2C contains an error, then the circuit 2J will generate a "1" for error signal $ER_2$; etc. These column error checks are indicated in FIG. 2 as "check ECC error", and they occur for a particular column as soon as the transmission of that column is completed.

Note that an ECC check is not performed on the column of bit-parity words from the RAM 5C. That is because the last word in the bit-parity column from the RAM 5C is not an error code check word; it is a bit-parity word that is generated from the four error code check words in the RAM's 1C–4C. Following that last bit-parity word an error code check word cannot be added because that would make the column of words from memory 5C one word longer than the other columns of words from the RAM's 1C–4C.

From the transmitters 1F–5F, each column of data words is stored in one particular sector of a separate magnetic disk (not shown). Then, at some later time, those disk sectors are read to retrieve the stored data word columns. During this read operation, each of the receivers 1G–5G asynchronously receives a respective column of the stored data words, and they in turn are processed by the FIG. 1 array processor as shown in FIG. 3.

Each data word that is received by the receiver 1G is passed through the register 1H and multiplexor 1A and written into the RAM 1B. Likewise, the data words to receiver 2G are passed through register 2H and multiplexor 2A and written into the RAM 2B; the data words to receiver 3G are passed through register 3H and multiplexor 3A and written into the RAM 3B; the data words to receiver 4G are passed through register 4H and multiplexor 4A and written into the RAM 4B; and the data words to receiver 5G are passed through register 5H and written into the RAM 5B.

Figure 3:
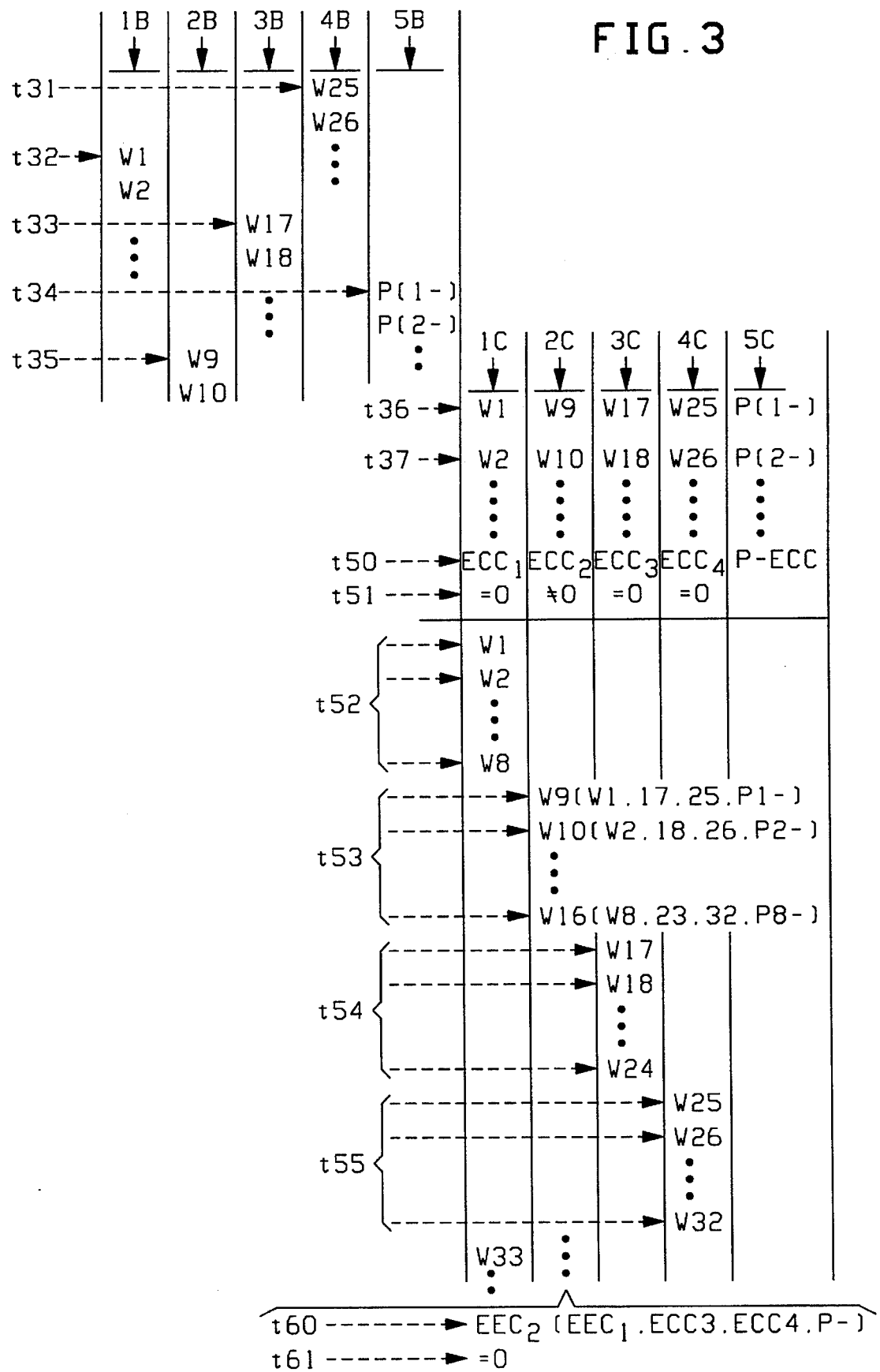
FIG. 3 is a timing diagram that shows the manner by which the FIG. 1 circuit reads an array of data words from an array of disks and regenerates an erroneous column in the words that are read.

An example of the above data word transfer into the RAM's 1B–5B is shown in FIG. 3 wherein the fourth column of words starts to get written at time t31 into the RAM 4B; the first column of words starts to get written at time t32 into the RAM 1B; the third column of words starts to get written at time t33 into the RAM 3B; the fifth column of words starts to get written at time t34 into the RAM 5B; and, the second column of words starts to get written at time t35 into the RAM 2B.

When everyone of the RAM's 1B–5B stores at least one data word, those data words are read one row at a time from the RAM's 1B–5B and written into the RAM's 1C–5C. This is illustrated as initially occurring in FIG. 3 at time t36 wherein the first row of words W1-W9-W17-W25-P(1-. . .) is written into the RAM's 1C-5C. Likewise, at time t37, the second row of words W2-W10-W18-W26-W(P2-. . .) is written into the RAM's 1C-5C. This row by row writing process continues until the entire array is written into the RAM's 1C-5C, which in FIG. 3 occurs at time t50.

As each row of words is written into the RAM's 1C-5C, that row of words is also sent to the bit-parity checker circuit 6A. If any row of words has a bit-parity error, the checker circuit 6A generates an error signal $ER_5$.

Also, as each row of words is written into the RAM's 1C-5C, the words from the RAM's 1B-4B are respectively sent through the multiplexors 1I-4I to the column error detect circuits 1J-4J. If the first column of words from RAM 1B contains an error, then the circuit 1J generates the error signal $ER_1$ as a "1"; if the second column of words from RAM 2B contains an error, then circuit 2J generates the error signal $ER_2$ as a "1"; etc. In FIG. 3, this operation is illustrated as occurring at time t51 wherein, as an example, an error is detected in the second column of data words and no error is detected in the first, third, and fourth column of data words.

Based on the detection of an error in the second column of data words in the RAM 2C, that column of words is no longer used. Instead, the second column of words is regenerated by sending the first, third, fourth, and fifth columns of words from the RAM's 1C and 3C–5C through the multiplexor 6B to the bit-parity generator 6C. Then, the regenerated second column of words together with the first, third, and fourth column of words are sequentially sent through the multiplexor 7C and register 7D to the transmitter 7E.

FIG. 3 illustrates the above operation wherein during time t52, eight data words W1–W8 are sequentially read from the RAM 1C and sent to the transmitter 7E. Thereafter, during time t53, the eight data words W9–W16 are regenerated and sent to the transmitter 7E. Word W9, for example, is regenerated by sending the words W1, W17, W25, and P(1-. . .) from the RAM's 1C and 3C–5C through the multiplexor 6B to bit-parity generator 6C. Then, during time t54, the eight data words W17–W24 are sequentially read from the RAM 3C and sent to the transmitter 7E; and, at time t55 the eight words W25–W32 are sequentially read from the RAM 4C and sent to the transmitter 7E. This process then repeats in a similar fashion until a complete array of words is sent to the transmitter 7E.

As the second column of words is regenerated by the bit-parity generator 6C, those words are also sent to the column error detect circuit 6D. In response, circuit 6D checks to see if the regenerated column of data words has an error. This check is possible because the last word of each column is an error correction code (as was previously described), and that code is regenerated just like any other data word during the above regeneration process. In FIG. 3, the regeneration of the error correction code $ECC_2$ for the second column of data words is illustrated as occurring at time t60, and the use of that code by circuit 6D to detect the absence of an error is illustrated as occurring at time t61.

By comparison, suppose that at time 61, the circuit 6D did detect an error in the regenerated column of data words. That error is indicated in FIG. 1 by an error signal $ER_6$ from circuit 6D. Signal $ER_6$ occurs whenever a single one of the first four data word columns has an error and the fifth column also has an error. Also, signal $ER_6$ occurs when whenever a single one of the first four data word column has an error and one of remaining columns is received from the wrong sector on a disk. For example, one particular column of data words from the FIG. 1 transmitter 1F could get written on a disk at a sector X; but when an attempt is subsequently made to read sector X, a different sector with another column of data words could be received due to a fault.

Note that for the sake of simplicity, FIG. 3 only shows how the data words of a single array $A_1$ are processed. However, FIG. 3 can be modified to show how the FIG. 1 circuit 10 also processes multiple arrays simultaneously. With this modification, the data words are processed as shown up through time t54. Then, after word W25 is read from the RAM 4C at the start of time t55, the first row of words W1-W9-W17-W25-P(1-. .) in the RAM's 1C–5C can be replaced with the fist row of words of a second array $A_2$. Likewise, after word W26 is read from the RAM 4C, the second row of words W2-W10-W18-W26-P(2-. . .) can be replaced with the second row of words of the array $A_2$.

From the above it should be noted that even though the word W1 is read from the RAM 1C at the start of time t52, the word W1 cannot be replaced at that time. That is because the word W1 must later be read again from the RAM 1C in order to regenerate the first word in the erroneous second column. In a worst case scenario, the error would be in the fourth column; and to allow for that case, a row of words cannot be replaced until time t55 as described above.

Next, referring to FIGS. 4 and 5, the addressing circuits for the RAM's 1B–5B and 1C–5C which implement the FIG. 3 operations will be described in detail. All of FIG. 4 components are defined by Table 2 below, and all of the FIG. 5 components are defined by Table 3.

TABLE 2

| Circuit Component | Description |
| --- | --- |
| 20, 26 | inventor |
| 21, 29 | triggerable up-counter |
| 22, 27 | triggerable up-down-counter |
| 23 | non-zero detect circuit |
| 24, 25 | AND gate |
| 28 | full column detect |

TABLE 3

| Circuit Component | Description |
| --- | --- |
| 30-1 thru 30-4 | triggerable up-counter |
| 31-1 thru 31-4 | 2 × 1 multiplexor |
| 32 | 4 × 1 multiplexor |

Figure 4:
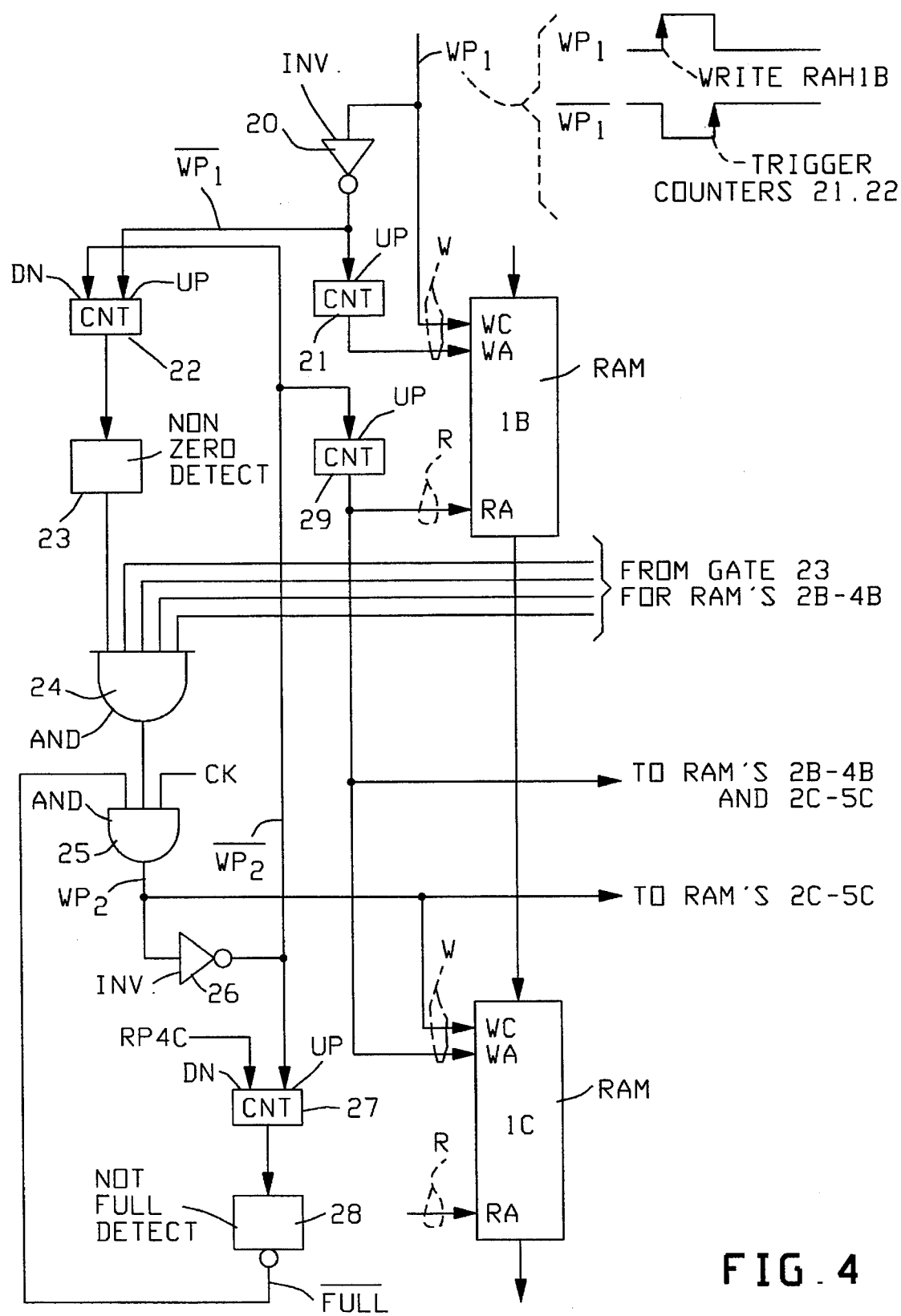
FIG. 4 shows a first addressing circuit, which is used by the array processing circuit of FIG. 1 to perform a portion of the FIG. 3 array read and column regenerate operation.

In FIG. 4, counter 21 provides a write address WA to RAM 1B; and, counter 29 provides a read address RA to RAM 1B as well as a write address WA to RAM 1C. Also, counter 22 keeps track of the number of words written into RAM 1B minus the number of words read from RAM 1B. Likewise, counter 27 keeps track of the number of words written into RAM 1C minus the number of words read from RAM 1C.

Initially in the FIG. 4 addressing circuit, each of the counters 21, 22, 27, and 29 is reset to zero. Thereafter, each time a data word is written into the RAM 1B (from the FIG. 1 port P1 through receiver 1G, register 1H, and multiplexor 1A), a write pulse $WP_1$ from port $P_1$ is sent to a write control input WC on the RAM 1B. At the same time, the RAM 1B receives a write address WA from the counter 21. Thus, each data word from the FIG. 1 receiver 1G is stored in the RAM 1B at an address which is provided by the counter 21.

Each write pulse $WP_1$ also goes to the inverter 20 which generates the inverse signal $\overline{WP}_1$. Then, a rising edge in the signal $\overline{WP}_1$ on the UP terminal of the counters 21 and 22 causes them to count up by +1. Thus, after a word of data is written into the RAM 1B, the counters 21 and 22 increase their count by one. Circuit 23 detects that the RAM 1B contains at least one word of data by sensing when the counter 22 has a non-zero count.

For each of the other RAM's 2B, 3B, 4B, and 5B, the components 20 thru 23 are repeated, and each of those RAM's receives a separate write pulse (similar to pulse $WP_1$) from port $P_2$-$P_5$. Then, when everyone of the components 23 detects a non-zero count, that event is sensed by the AND gate 24. In response, another write pulse $WP_2$ is generated by the AND gate 25, and that causes a row of words to be transferred in parallel from the RAM's 1B–5B to the RAM's 1C–5C. For this transfer, counter 29 provides the read address RA to the RAM's 1B–5B and the write address WA to the RAM's 1C–5C.

Write pulse $WP_2$ also goes to the inverter 26 which generates the inverse signal $\overline{WP}_2$. Then, a rising edge of signal $\overline{WP}_2$ on the UP terminal of the counters 27 and 29 causes them to count up by +1. Conversely, the rising edge of signal $\overline{WP}_2$ on the DN terminal of counter 22 cause it to count down by one.

Circuit 28 detects when a full column of words has been transferred into the RAM 1C by sensing a count of 512 in the counter 27. When a full column is detected, then circuit 28 generates the signal $\overline{FULL}$ as a "0", which inhibits the AND gate 25 from making further row transfers of another array, and which indicates that an examination of the error signals $ER_1$–$ER_4$ needs to occur such as the examination at time t51 in FIG. 3.

If only a single one of the error signals $ER_1$–$ER_4$ indicates an error, then an entire array is read from the RAM's 1C–5C while the erroneous column of data words is regenerated as described in FIG. 3 at times t52 thru t60. And, the control circuitry which performs that read operation is shown in FIG. 5.

Figure 5:
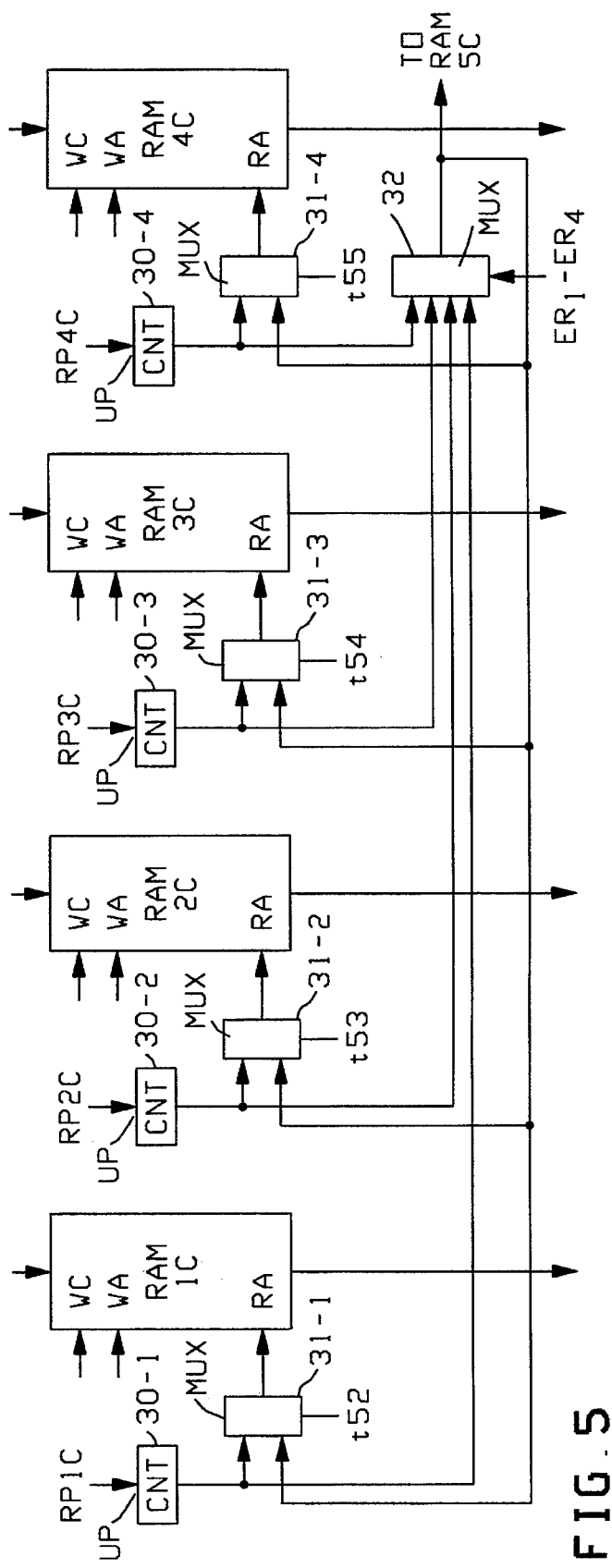
FIG. 5 shows a second addressing circuit which is used by the array processing circuit of FIG. 1 to perform the remainder of the FIG. 3 array read and column regenerate operation.

Initially in FIG. 5, each of the counters 30-1 thru 30-4 is reset to zero. Thereafter, during time interval t52 of FIG. 3, the counter 30-1 is triggered eight times on its UP terminal by eight read pulses RP1C. Each trigger occurs on the rising edge of pulse RP1C, and that causes the counter 30-1 to count up by one.

Similarly, during time interval t53 of FIG. 3, the counter 30-2 is triggered eight times on its UP terminal by eight read pulses RP2C. Then during time interval t54 of FIG. 3, the counter 30-3 is triggered eight times on it's UP terminal by eight read pulses RP3C; and during time interval t55 of FIG. 3, the counter 30-4 is triggered eight times on it's UP terminal by eight read pulses RP4C.

Also, during time interval t52, the multiplexor 31-1 sends the output of counter 30-1 to the RAM 1C as the read address RA. But during the other time intervals t53, t54 and t55, the multiplexor 31-1 sends the output of multiplexor 32 to the RAM 1C as the read address RA.

Similarly, during time interval t53, multiplexor 31-2 sends the output of counter 30-2 to the RAM 2C as the read address RA; during time interval t54, multiplexor 31-3 sends the output of counter 30-3 to the RAM 3C as the read address RA; and during time interval t55, multiplexor 31-4 sends the output of counter 30-4 to the RAM 4C as the read address RA. At all other times, the multiplexors 31-2, 31-3, and 31-4 respectively sends the output of multiplexor 32 to the RAM's 2C, 3C, and 4C as the read address RA.

If error signal $ER_1$ is true, then the output of counter 30-1 is sent through multiplexor 32. Similarly, if error signal $ER_2$ is true, then the output of counter 30-2 is sent through multiplexor 32; if error signal $ER_3$ is true, then the output of counter 30-3 is sent through multiplexor 32, and if error signal $ER_4$ is true, then the output of counter 30-4 is sent through multiplexor 32.

Suppose now that the error signal $ER_2$ is true, as was previously the case in FIG. 3. In that case, the counter 30-1 will address RAM 1C during time interval t52; and its output will pass through the FIG. 1 multiplexor 1D to the transmitter 7E. Then the counter 30-2 will address all of the RAM's 1C–5C during time interval t53; and their outputs will pass through the FIG. 1 multiplexor 6B, bit-parity generator 6C, and multiplexor 2D to the transmitter 7E. Next the counter 30-3 will address RAM 3C during time interval t54; and its output will pass through the FIG. 1 multiplexor 3D to the transmitter 7E. Then the counter 30-4 will address RAM 4C during time interval t55; and its output will pass through the FIG. 1 multiplexor 4D to the transmitter 7E. Thereafter, the above addressing of the RAM's 1C–5C is repeated in a cyclic fashion until the entire array has been read and an erroneous column regenerated.

During the above operation, each of the read pulses RP4C to UP terminal on the counter 30-4 in FIG. 5 also goes to the DN terminal of the counter 27 in FIG. 4. In response to the rising edge of each read pulse RP4C, counter 27 counts down by one. This indicates that all processing on the row of words in the RAM's 1C–5C, that was previously addressed by the counters 30-1 thru 30-4, is now complete; and thus, a new row of words can be transferred from the RAM's 1B–5B into the RAM's 1C–5C.

Figure 6:
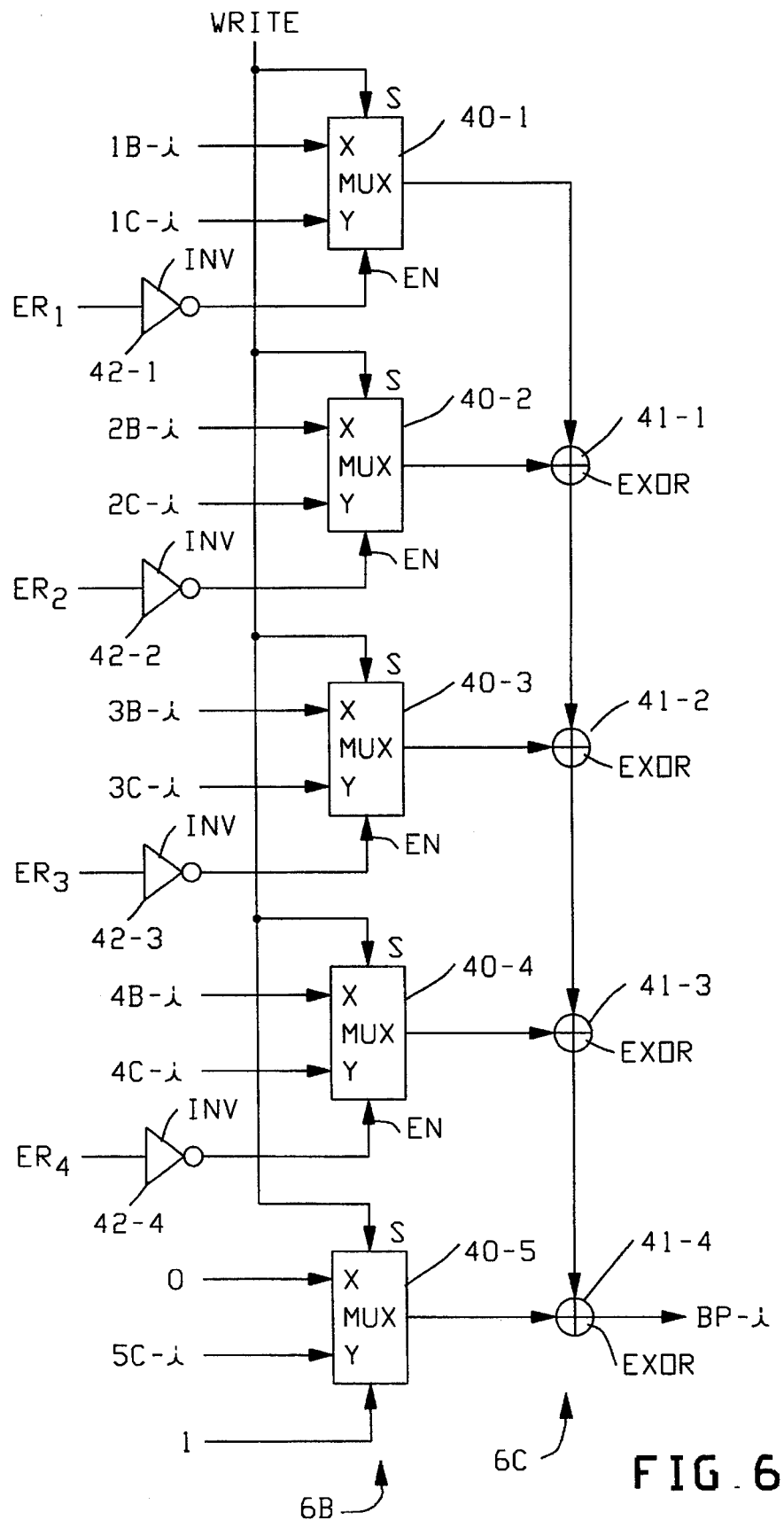
FIG. 6 shows two modules 6B and 6C within the FIG. 1 circuit in greater detail; and, FIG. 7 shows two error circuits which operate in conjunction with the FIG. 1 circuit to report uncorrectable errors.

Next, referring to FIG. 6, the structural details of the FIG. 1 multiplexor 6B and bit-parity generator 6C will be described. In FIG. 6, all of the components which are shown operate on just one bit (the i-th bit) of the data words from the RAM's 1B–4B and 1C–5C. Signal 1B-i is the i-th bit from RAM 1B; signal 1C-i is the i-th bit from RAM 1C; signal 2B-i is the i-th bit from RAM 2B; etc. Thus, in the complete multiplexor 6B and complete parity generator 6C, all of the FIG. 6 components are repeated once for each bit a data word. These FIG. 6 components are identified in Table 4 below.

TABLE 4

| Component | Description |
| --- | --- |
| 40-1 thru 40-5 | 2 × 1 multiplexor |
| 41-1 thru 41-4 | exclusive-OR gate |
| 42-1 thru 42-4 | inverter |

In operation, when an array write is being performed as described in conjunction with FIG. 2, signal WRITE to each multiplexor control input S in FIG. 6 causes the multiplexors 40-1 thru 40-4 to pass the data signals from the RAM's 1B–4B and causes multiplexor 40-5 to pass a "0". Those signals from the multiplexors 40-1 thru 40-5 are then exclusively-OR'd together by the gates 41-1 thru 41-4 to thereby generate the i-th bit-parity signal BP-i. A full word of those signals BP-i is stored in the RAM 5C of FIG. 1 at time t4a, t4b, . . . etc. as shown in FIG. 2.

Conversely, whenever an array read is being performed as described in conjunction with FIG. 3, the signal WRITE is false which causes the multiplexors 40-1 thru 40-5 to select the data signals from the RAM's 1C–5C. Each of the selected data signals then passes through the multiplexors 40-1 thru 40-5 except for the signals from the RAM whose column of data words has an error. If the first column of data words in the RAM 1C has an error, then the signal $\overline{ER_1}$ from inverter 42-1 disables multiplexor 40-1 which generates a "0" on that multiplexor's output. Likewise, if the second column of data words in the RAM 2C has an error, then the signal $\overline{ER_2}$ from inverter 42-2 disables multiplexor 40-2 which generates a "0" on its output; etc. Consequently, the bit parity signal BP-i from the FIG. 6 gates 41-1 thru 41-4 is the exclusive-or of only the error-free data in the RAM's 1C–5C.

Figure 7:
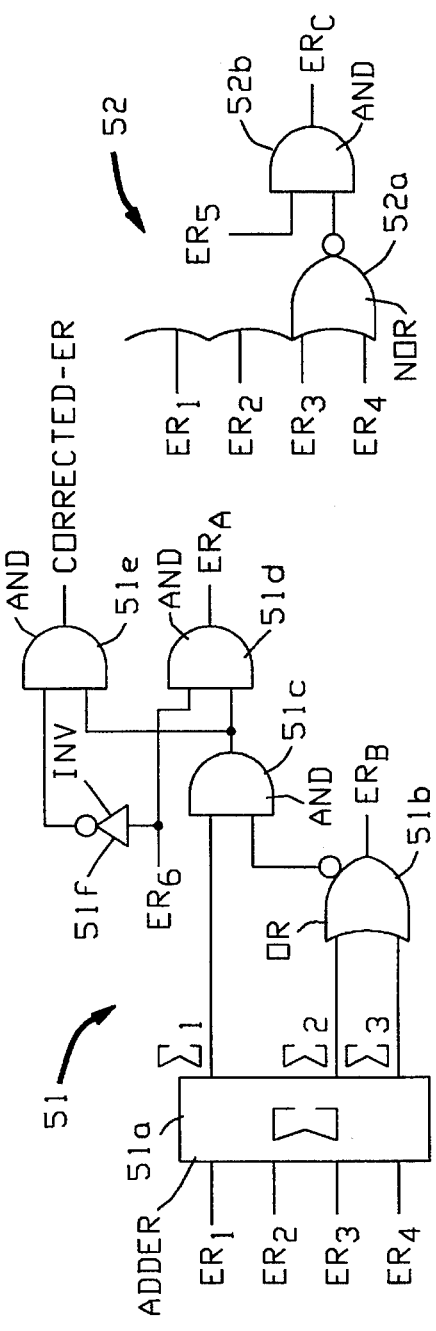

In the case where just one of the first four columns of data words has an error, and that error is corrected by the previously described process of FIG. 3, then this event is detected by the FIG. 7 circuit 51 and reported via the signal CORRECTED-ER. Circuit 51 consists of a four-bit adder 51a, an OR gate 51b, three AND gates 51C-51e, and an inverter 51f, all of which are interconnected as shown.

Conversely, if one of the first four columns of data words has an error, but that error is uncorrectable because one of the remaining columns was read from the wrong sector or the fifth column has an error, then this event is detected by circuit 51 and reported as $ER_A$. Further, if more than one of the first four data columns have an error, then this event is detected by the circuit 51 and reported as $ER_B$.

Suppose now that during an array read operation, the first four columns of data words are error free but the fifth column in the RAM 5C has an error. When this event occurs, each of the error signals $ER_1$ thru $ER_4$ will be false; but error signal $ER_5$ from the bit-parity checker circuit 6A will be true. This event can be detected by circuit 52 of FIG. 7 and reported as $ER_C$. Circuit 52 consist of NOR-gate 52a and AND-gate 52b which are interconnected as shown.

Similarly, when none of the five data word columns has an error but one of those columns is received from the wrong sector on a disk, then again the signals $ER_1$ thru $ER_4$ are false but signal $ER_5$ is true. This event is thus detected by circuit 52 and reported as $ER_C$.

A preferred embodiment of the invention has now been described in detail. In addition, however, many changes and modifications can be made to this embodiment without departing from the nature and spirit of the invention.

For example, the number of data words per column is not limited to 512. Instead, the number of data words per column can be any desired positive integer M. To process the M words per column, each of the FIG. 1 RAM's 1C–5C is expanded or contracted to hold at least M words.

Likewise, the number of columns in the array is not limited to five. Instead, the number of columns in the array can be any positive integer N. To process the first N–1 columns, the FIG. 1 circuit modules 1A–1J are repeated N–1 times; the FIG. 1 circuit modules 5A–5H, as shown, process the N-th column; and the FIG. 1 circuit modules 6A–6C and 7E are expanded to receive the N–1 columns.

Similarly, the number of bits per word is not limited to eight. Instead, the number of bits per word can be any number B. Also, the bits of each word can represent any type of data or be a mixture of several types of data. For example, the first B-1 bits can represent one thirty-two bit entry into a computer data base and the B-th bit can be a parity bit for all thirty-two bits of that entry (i.e.—a word parity bit).

Also, during the write-operation of FIG. 2, the sequence by which the RAM's 1B–4B are loaded at times t1–t4 can be modified. In particular, during each of the times t1–t4, the number of words that are written into one of the RAM's 1B–4B can be increased or decreased over the illustrated eight words. Also, the order in which the RAM's 1B–4B are loaded can be changed from the illustrated order of 1B-2B-3B-4B to any other desired order, such as 4B-3B-2B-1B or 1B-3B-2B-4B.

Whenever the above modification to the write operation is made, then a matching modification must also be made to the read operation during the time intervals t52–t55 of FIG. 3. For example, if the t1–t4 write sequence is 1B-3B-2B-4B, then the t52–t55 read sequence must be 1C-3C-2C-4C.

Also, as another modification, each of the FIG. 1 column error detect circuits 1J–4J and 6D can have anyone of several prior art structures and can employ anyone of several prior art codes. Examples of suitable codes are linear block codes, cyclic codes, BCH code, burst-error correcting codes, and convolutional codes; and they are described in the textbook "Error Control Coding: Fundamentals and Applications" by Shu Lin and Daniel J. Costello, Jr., copywrite 1983, Prentice-Hall, Inc. In one specific embodiment of the FIG. 1 circuit that was actually constructed, each of column error detect circuit 1J–4J and 6D (as well as the external circuit which generated the ECC characters) consisted of an eight-bit register having outputs Q8-Q1 which are defined by the logic equations of Table 5. In Table 5, I8-I1 is the input word and XOR is the exclusive-or operation.

TABLES 5

Q1= I2 XOR Q2
Q2= I3 XOR Q3
Q3= I4 XOR Q4
Q4= I1 XOR Q1 XOR I5 XOR Q5
Q5= I1 XOR Q1 XOR I6 XOR Q6
Q6= I1 XOR Q1 XOR I7 XOR Q7
Q7= I8 XOR Q8
Q8= I1 XOR Q1

Accordingly, it is to be understood that the invention is not limited to the preferred embodiment but is defined by the appended claims.

What is claimed is:

1. An array processing circuit, for use in detecting and correcting errors in an M row by N column array of digital words, with each word of a column containing multiple bits; said circuit being comprised of:

a first set of N memories which have respective inputs, each of which asynchronously receives a respective column of said words from a separate input channel;

a second set of N memories which have respective inputs that are coupled to corresponding outputs of said first set of memories;

a first control circuit which a) detects whether each memory of said first set contains a respective word of the same row, and in response to such detection, b) transfers that row of words in parallel to said second set of memories;

N–1 column error detect circuits, having inputs respectively coupled to the outputs of the first N–1 memories of said first set, each of which detects when a column of words from the memory has an error; and, a second control circuit having inputs coupled to said N–1 column error detect circuits and outputs coupled to said second set of memories, which when only the i-th one of said N–1 column error detect circuits detects an error, a) sequentially reads words from each of the memories 1 thru i-1 of the second set, b) reads words from all of the second set memories in parallel, c) sequentially reads words from each of the memories i+1 thru N–1 of the second set; and then, repeats the reading sequence a) thru c) until all of the words in said array are read.

2. An array processing circuit according to claim 1 which further includes a bit-parity generator circuit, having inputs coupled to outputs from said second set of memories, which generates bit-parity signals for corresponding bits in said words that are read in parallel by a second addressing circuit excluding the words from the ith memory of the second set.

3. An array processing circuit according to claim 2 which further includes an additional column error detect circuit, having inputs coupled to receive said bit-parity signals from said bit-parity generator circuit, which detects when a complete column of said bit-parity signals, as generated for a complete array of words that is read by said second control circuit, contains an error and generates an error signal indicating same.

4. An array processing circuit according to claim 3 wherein said second control circuit includes: a respective counter and a corresponding multiplexor for each of the memories 1 thru N–1 of said second set with each counter sending first address signals to a first input on said corresponding multiplexor, an additional multiplexor which receives said first address signals from all of the respective counters and transfers the i-th one of the received first address signals to a second input on all of the corresponding multiplexors, and each of the memories 1 thru N−1 of said second set being coupled to said corresponding multiplexor to receive addresses therefrom.

5. An array processing circuit according to claim 4 which further includes an output selection circuit, having inputs coupled to the outputs of said memories 1 thru N−1 of said second set and said parity generator circuit, which transfers to an output port the data words from said memories 1 thru N−1 of said second set as read by said second control circuit, except that when said data words are read in parallel by said second control circuit, said bit-parity signals from said bit-parity generator circuit are transferred to said output port.

6. An array processing circuit according to claim 5 wherein said parity generator circuit and said additional column error detect circuit operate on a first array words from said second set of memories, while simultaneously, said N−1 column error detect circuits operate on a second array of words from said first set of memories.

7. An array processing circuit according to claim 5 further includes a control circuit which senses when more than one of said N−1 column error detect circuits detects an error and generates a control signal indicating same.

8. An array processing circuit according to claim 5 which further includes a bit parity check circuit, having inputs coupled to said outputs from the memories of said first set, which check parity on corresponding bits in said row of words therefrom; and, a control circuit which generates a control signal when none of said N−1 column error detect circuits detects an error but said parity check circuit does detect an error.

9. An array processing circuit according to claim 5 wherein said bit-parity generator circuit includes a set of N multiplexors with each multiplexor having a first input respectively coupled to the output of the memories 1 thru N of said second set, with multiplexor 1 thru N−1 having a second input respectively coupled to the output of the memories 1 thru N−1 of the first set, and with multiplexors 1 thru N−1 being disabled respectively by said column error detect circuits 1 thru N−1 detecting an error.

10. An array processing circuit according to claim 9 wherein each of said memories 1 thru N−1 of said first set have their input coupled to a respective multiplexor which selectively receives said words from a separate input port or one common input port, and wherein memory N of said second set has its input coupled to a multiplexor which selectively receives words from memory N of said first set or said parity generator.

\* \* \* \* \*